(12) United States Patent
Suthar et al.

(10) Patent No.: US 10,834,242 B2
(45) Date of Patent: *Nov. 10, 2020

(54) INFORMATION CENTRIC NETWORKING FOR LONG TERM EVOLUTION

(71) Applicant: Cisco Technology, Inc., San Jose, CA (US)

(72) Inventors: Om Prakash Suthar, Bolingbrook, IL (US); Paul A. Polakos, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,009

(22) Filed: Feb. 22, 2019

(65) Prior Publication Data

US 2019/0191016 A1     Jun. 20, 2019

Related U.S. Application Data

(63) Continuation of application No. 15/470,934, filed on Mar. 28, 2017, now Pat. No. 10,257,327.

(Continued)

(51) Int. Cl.
*H04L 29/08* (2006.01)
*H04L 29/06* (2006.01)
(Continued)

(52) U.S. Cl.
CPC .......... *H04L 69/22* (2013.01); *H04L 61/2007* (2013.01); *H04L 67/2842* (2013.01);
(Continued)

(58) Field of Classification Search
None
See application file for complete search history.

(56) References Cited

U.S. PATENT DOCUMENTS 10,447,824 B2     10/2019  Suthar
2011/0085471 A1*  4/2011   Zhang ................... H04W 16/00
                                                370/254

(Continued)

FOREIGN PATENT DOCUMENTS

WO   2016/057704   4/2016
WO   2016/061243   4/2016

OTHER PUBLICATIONS

3GPP Organizational Partners, "3rd Generation Partnership Project; Technical Specification Group Core Network and Terminals; Mobile radio interface Layer 3 specification; Core network protocols; Stage 3 (Release 13)", 3GPP TS 24.008 V13.5.0, Mar. 2016, 740 pages.

(Continued)

*Primary Examiner* — Ayanah S George (57) ABSTRACT

In one embodiment, a mobile network includes at least one Information Centric Networking (ICN) enabled mobile base station configured to support ICN transport protocol, and at least one ICN enabled evolved packet core (EPC) device configured to support ICN transport protocol, where the ICN enabled EPC device is operative to assign an ICN based identity to a user equipment (UE) according to an attach request, wherein the attach request indicates that the UE supports the ICN transport protocol.

20 Claims, 10 Drawing Sheets

Related U.S. Application Data (60) Provisional application No. 62/356,283, filed on Jun. 29, 2016.

(51) Int. Cl.
*H04L 29/12* (2006.01)
*H04W 76/12* (2018.01)
*H04W 76/28* (2018.01)

(52) U.S. Cl.
CPC ............ *H04L 67/327* (2013.01); *H04L 69/04* (2013.01); *H04W 76/12* (2018.02); *H04W 76/28* (2018.02)

(56) References Cited

U.S. PATENT DOCUMENTS

| | | |
|---|---|---|
| 2013/0044708 A1 | 2/2013 | Kim et al. |
| 2013/0060962 A1 | 3/2013 | Wang |
| 2013/0173822 A1 | 7/2013 | Hong |
| 2013/0227166 A1 | 8/2013 | Ravindran et al. |
| 2013/0332619 A1* | 12/2013 | Xie ................... H04L 67/2823 709/230 |
| 2014/0192717 A1 | 7/2014 | Liu et al. |
| 2014/0195641 A1* | 7/2014 | Wang .................. H04L 67/327 709/217 |
| 2015/0195764 A1 | 7/2015 | Chung |
| 2016/0057788 A1 | 2/2016 | Sharma et al. |
| 2016/0100350 A1 | 4/2016 | Laraqui et al. |
| 2016/0173374 A1 | 7/2016 | Shailendra et al. |
| 2016/0241669 A1 | 8/2016 | Royon et al. |
| 2018/0007176 A1 | 1/2018 | Suthar et al. |
| 2018/0206278 A1 | 7/2018 | Mildh |
| 2019/0364138 A1 | 11/2019 | Suthar |

OTHER PUBLICATIONS

Triadimas Arief Satria et al., "Performance evaluation of ICN/CCN based service migration approach in virtualized LTE systems", 2014 IEEE 3rd International Conference on Cloud Networking (CloudNet), Oct. 8-10, 2014, 7 pages.
International Search Report dated Dec. 1, 2017 for PCT Application No. PCT/IB2017/053557.
Yang, Chenchen et al., When ICN Meets C-RAN for HetNets: An SDN Approach, Nov. 9, 2015.
Ravindran, R. et al., "Supporting seamless mobility in named data networking", in Proceedings of the IEEE International Conference on Communications, ICC, 2012, pp. 5854-5869.
GSA Global Mobile Suppliers Association; LTE subscriptions doubles in past year to reach 1.29 billion available at: http://gsacom.com/press-release/gsa-confirms-global-lte-subcriptions-doubled-past-year-reach-1-29-billion-q1-2016/.
ETSI TS 124301 V13.3.1 (Aug. 2016); Universal Mobile Telecommunications System (UMTS); LTE: Non-Access-Stratum (NAS) Protocol for Evolved Packet System (EPS); Stage 3, (3GPP TS 24.301 version 13.6.1 Release 13).
Bormann, C. (editor); RFC3095—Robust Header Compression (ROHC): Framework and four profiles: RTP, UDP, ESP, and uncompressed, Jul. 2001.
3GPP TS 24.008 V13.5.0 (Mar. 2016); 3rd Generation Partnership Project; Technical Specification Group Core Network and Terminals; Mobile radio interface Layer 3 specification; Core network protocols; Stage 3 (Release 13).
Carofiglio, Giovanna et al., "Scalable Mobile Backhauling via Information-Centric Networking"; The 21st IEEE International Workshop on Local and Metropolitan Area Networks, Beijing, 2015, pp. 1-6.
Examination Report in counterpart European Application No. 17734486.8, dated Feb. 18, 2020, 5 pages.

* cited by examiner

INFORMATION CENTRIC NETWORKING FOR LONG TERM EVOLUTION

CROSS REFERENCE TO RELATED APPLICATIONS

This application is a continuation of U.S. patent application Ser. No. 15/470,934, filed Mar. 28, 2017, entitled "Information Centric Networking for Long Term Evolution," which claims priority to provisional U.S. Application No. 62/356,283, filed Jun. 29, 2016, the entire contents of which are both hereby incorporated by reference.

FIELD OF THE INVENTION

The present invention generally relates to the deployment of information centric networking (ICN) in long term evolution (LTE) mobile networks.

BACKGROUND OF THE INVENTION

Globally, over 1.3 billion subscribers use Long Term Evolution (LTE) technology, with annual growth of ~100% annually. Existing LTE networks are based on 'Global System Mobile Association' (GSMA), 3rd Generation Partnership Project (3GPP) standards and various specifications providing architectural details. LTE network architectures typically use Internet Protocol (IP) as the main transport protocol for control plane (signaling messages), user plane (content delivery) and management plane (Operations, administration and management functions) communications.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for improving content delivery for a user equipment (UE) is implemented on a computing device and includes: receiving a request from an application layer on the UE, determining whether said request is an ICN-based request using Information Centric Networking (ICN) transport protocol or an IP-based request using Internet Protocol (IP) transport protocol, and for each ICN-based request according to the determining: forwarding the ICN-based request to an ICN function on the UE, and compressing ICN headers in the ICN-based request using robust header (RoHC) compression.

A method for improving content delivery is performed on a mobile base station and includes: configuring the mobile base station to support ICN transport protocol, and storing content for delivery over the ICN transport protocol in an ICN content cache on the mobile base station.

A method for supporting ICN on a long term evolution (LTE) evolved packet core (EPC) device includes: receiving an initial attach request from a user equipment (UE), where the initial attach request includes an indication of support for ICN transport protocol on the UE, authenticating the UE, creating a session for the UE, where a Packet Data Network (PDN) type is assigned for the session is ICN.

Description

It will be appreciated by persons of ordinary skill in the art that the reliance on IP as the main transport protocol for LTE's user plane may be inefficient primarily due to IP's optimization for layer-3 payload transfer. The optimization for network layer-3 effectively renders IP less efficient for application layer-7 content delivery (offline video, real-time streaming video or time sensitive online gaming etc.). For example, when delivering content in unicast, each mobile unit receives a separate stream from a content server, thereby making redundant use of limited network resources. It will be appreciated that there have been recent advances in multicast and broadcast technologies for content delivery in LTE networks, but actual deployment in the field is limited or considered experimental due to a complex signaling architecture. Furthermore, such technologies require separate frequency spectrums, which are also limited resources in the mobile environment. It will therefore be appreciated that LTE's current architecture may be inefficient and non-optimal for high volume content delivery to mobile devices.

Information Centric Networking (ICN) is a rapidly evolving technology for efficient multimedia content delivery to end devices using Content Delivery Network (CDN) engines, caches, servers, and/or repositories. Existing research and development for ICN has primarily focused on fixed wireline networks and limited wireless networks using Wi-Fi, etc. No specification or standard is currently in use for including ICN in LTE architecture.

It will be appreciated that ICN may remedy some of the deficiencies of IP in an LTE environment. For example, in IP, resource names are transitory, thereby necessitating redundant setup for requests for the same resource from different network entities. In ICN, resource names are persistent, regardless of physical storage location. Accordingly, a given resource may be allocated a unique name that may be used consistently and uniformly throughout a network.

Figure 1:
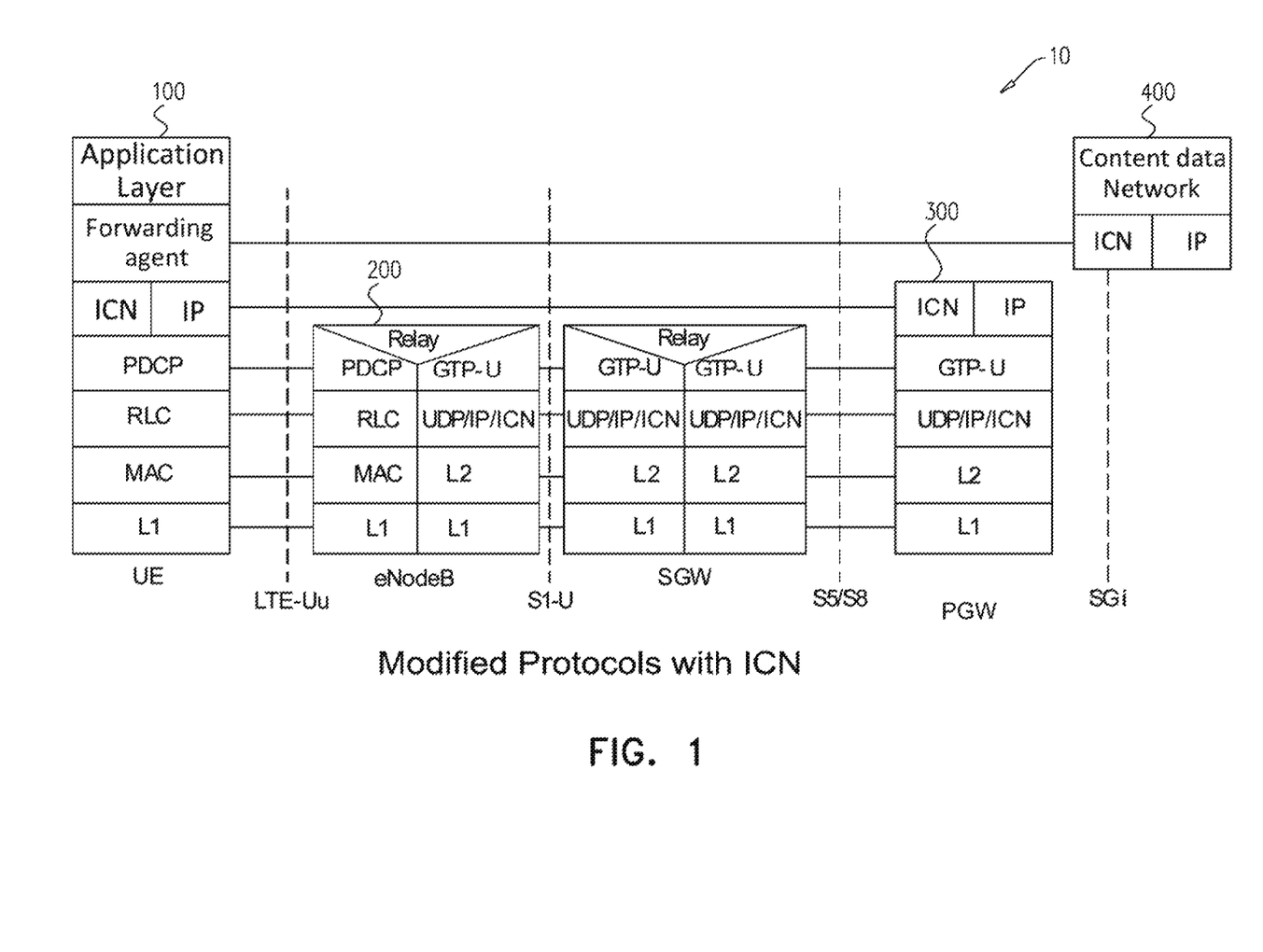
FIG. 1 is a simplified schematic illustration of an exemplary ICN enabled LTE architecture, constructed and operative in accordance with embodiments described herein.

In accordance with embodiments described herein, LTE architecture may therefore be modified to support ICN for content delivery by implementing ICN in mobile user equipments (UEs), base stations (BSs), and/or the evolved packet core (EPC), sometimes referred to as a mobile packet core (MPC). Reference is now made to FIG. 1 which represents a simplified schematic illustration of an exemplary ICN enabled LTE architecture 10, constructed and operative in accordance with embodiments described herein.

FIG. 1 depicts a 3GPP environment, where the control plane uses IP based Non-Access Stratum (NAS) signaling on S-1 Mobility Management Entity (MME), and General Packet Radio Service Tunneling Protocol-Control (GTP-C) messages on S11 interfaces, for mobility management and session management respectively. Similarly, for the user plane, IP based, S1-U, S5, and S8 interfaces are used in unicast for content delivery.

ICN enabled LTE architecture 10 comprises UE protocol stack 100, mobile base station protocol stack 200 (e.g., implemented on an eNodeB as depicted in FIG. 1), Evolved Packet Core/Packet Data Network Gateway (EPC/PGW) protocol stack 300, and CDN 400. As depicted in FIG. 1, in order to improve efficiency for user plane content delivery from ICN enabled CDN 400, ICN may be implemented instead of, or in parallel with IP, as a dual stack protocol stack for a UE and PGW.

As referred to herein, a UE is any type of device which attaches to a cellular network using 3G/UMTS or LTE technologies. The protocols and software stack used inside an LTE capable UE may therefore support both 3G and LTE software inter-working and handover. The latest 3GPP Release 13 (Rel.13) (and subsequent) specifications describe the use of both IP and non-IP protocols to establish logical/session connectivity. In accordance with embodiments described herein, this specified functionality may be leveraged to deploy an ICN protocol stack in a UE.

In accordance with embodiments described herein, ICN may be implemented in a UE by inclusion of a forwarding agent function inserted between the application and network layers. This forwarding agent function may interface with the application layer, and may be configured to provide forwarding decision algorithms to route requests. For example, forwarding decisions may be based on criteria such as application preference (e.g., ICN vs IP transport), content locations, content types, publisher's details, cost, network congestion, quality of service (QoS) and/or any other customizable parameters. For example, the forwarding agent function may, in at least one embodiment, monitor application layer parameters through software probes to discover network status, preference etc. and apply this to forwarding decision algorithms.

For example, ICN may be implemented in a dual stack arrangement in parallel with IP for a UE as represented in UE protocol stack 100. In accordance with embodiments described herein, the UE ICN transport protocol may communicate with either the ICN function in EPC/PGW protocol stack 300 (if, for example, ICN is implemented in the PGW), and/or an ICN function in CDN 400, depending upon how, and to what extent, ICN is implemented in the network.

Figure 2:
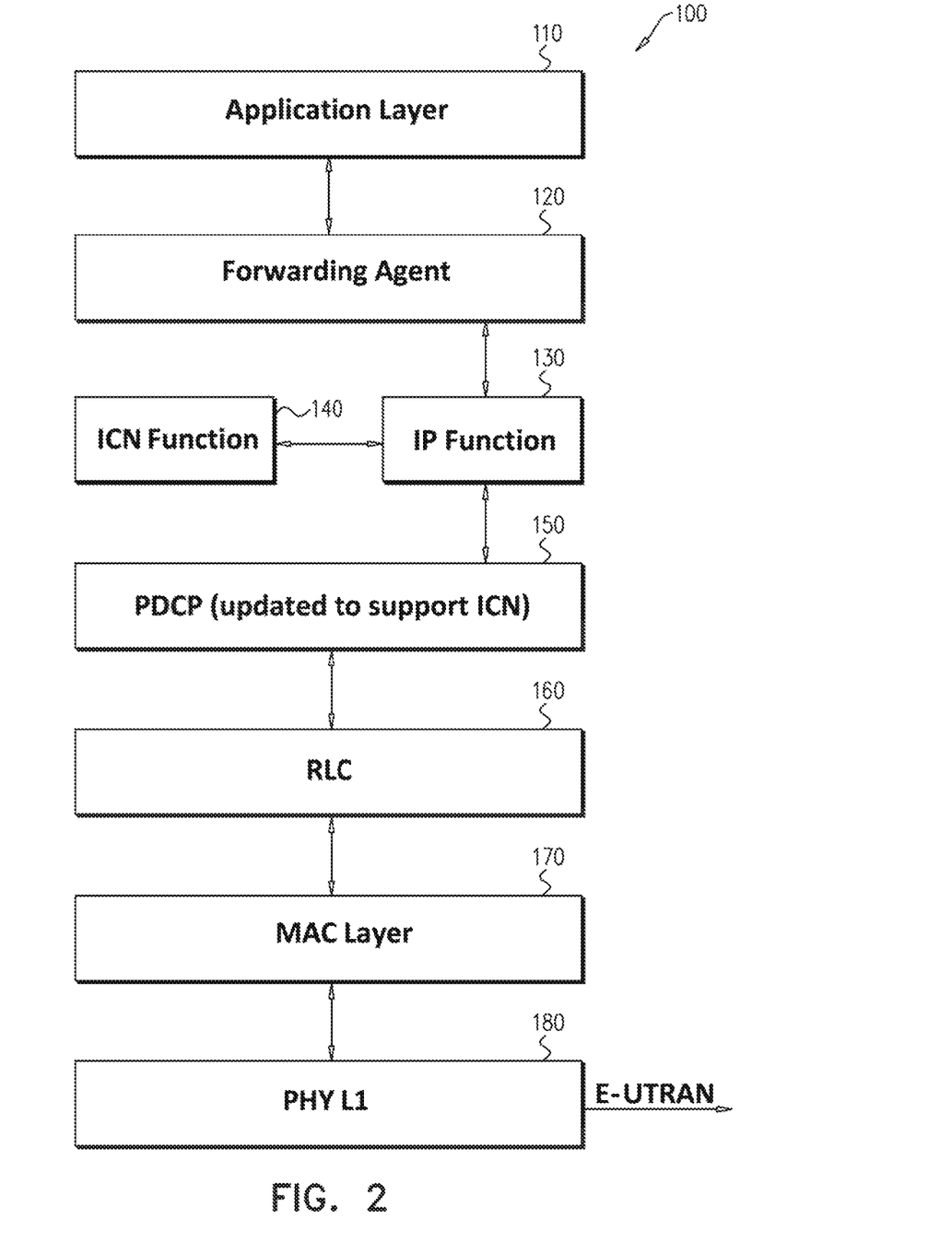
FIG. 2 and FIG. 3 are simplified schematic diagrams of exemplary user equipment (UE) protocol stacks for implementing ICN according to the architecture of FIG. 1.

It will be appreciated by one of ordinary skill in the art that such an arrangement may not require changes to device (i.e., the UE) modem firmware because ICN may be overlaid on top of IP without modification of the native environment. This approach may minimize the resources required to provide ICN functionality while also maintaining full support for legacy IP functionality. Reference is now made to FIG. 2 which is a simplified schematic diagram of an exemplary dual stack UE protocol stack 100 for implementing ICN in parallel with IP for a UE in accordance with embodiments described herein.

UE protocol stack 100 comprises application layer 110, forwarding agent 120, IP function 130, ICN function 140, Packet Data Convergence Protocol (PDCP) 150, Radio Link Control (RLC) 160, Medium Access Control (MAC) 170 and physical layer (PHY L1) 180.

Application layer 110 may refer to the protocol layer for any of a variety of software and/or hardware applications implemented on a UE in system 10, for example, but not limited to, applications for the provision and display of content on the UE. It will be appreciated that the applications in application layer 110 may not be uniformly configured to support the use of a given transport protocol. Specifically, some of the applications may be configured to support the use of IP, some may be configured to support the use of ICN, and some may be configured to support both.

Accordingly, forwarding agent 120 may be configured to route outgoing traffic (e.g., fetch requests from CDN 400, communications with other UEs, etc.) from application layer 110 via either IP function 130 or ICN function 140 based on the capabilities of the originating applications in application layer 110. In accordance with embodiments described herein, forwarding agent 120 may be implemented as a software based router implemented using any suitable mechanism such as, for example, Representational State Transfer (REST), TCP/IP socket and/or Extensible Markup Language (XML), etc.

Forwarding agent 120 may be configured to handle any one of three types of requests from application layer 110: IP-specific, where the application requests IP transport (either because the application doesn't support ICN or has, for whatever reason, been configured to prefer IP); ICN-specific, where the application requests ICN transport (either because the application doesn't support IP or has, for whatever reason, been configured to prefer ICN); or IP/ICN, where the application supports both IP and ICN and allows forwarding agent 120 to determine which transport protocol to use.

Forwarding agent 120 may then forward the application request to either IP function 130 or ICN function 140. It will be appreciated that IP function 130 may represent already existing functionality in the LTE standard, such that minimal changes, if any, may be needed to implement IP function 130 in architecture 10. For example, in accordance with at least one embodiment described herein, forwarding agent 120 may use a TCP/IP socket mechanism to communicate with IP function 130.

It will be appreciated that as described hereinabove, ICN may typically be more efficient than IP, such that forwarding agent 120 may be configured to prefer to route communications through ICN function 140 if a request from application layer 110 does not specify a preference for transport protocol.

In accordance with embodiments described herein, ICN function 140 may forward ICN interest packets and/or data packets using ICN overlay over IP to IP function 130. ICN interest packets are typically packets in which a request for content is included, whereas ICN data packets are response packets including requested content.

It will be appreciated that PDCP 150 may comprise existing PDCP functionality as currently implemented in existing LTE architecture. IP function 130 may therefore forward native IP traffic to PDCP 150, using a known header compression mechanism for IP. In accordance with embodiments described herein, PDCP 150 may also comprise additional functionality to support ICN overlaid over IP. PDCP 150 may also be configured to support header compression for ICN. For example, current PDCP implementations for LTE use robust header compression (RoHC) on air interface. In accordance with embodiments described herein, header compression for ICN may be implemented in PDCP 150 using a generally similar RoHC (RFC3095) header compression technique with enhanced algorithms that also support ICN.

It will be appreciated that RLC 160, MAC 170, and PHY L1 180 may be generally unaffected by the implementation of ICN protocol in UE protocol stack 100. Communications received by RLC 160 from PDCP 150 may be in the form of either native IP or ICN over IP; in either case, continued processing with UE protocol stack 100 may be consistent with existing IP only implementations.

In accordance with some embodiments described herein, a UE may be implemented with native ICN functionality to connect to a mobile network, where the mobile network may fetch content from internet/application servers within mobile provider to send some data to UE/application servers. For embodiments in which native ICN functionality is provided, significant changes may be needed in device modem firmware and other software upgrades to support NAS signaling, mobility and/or session management.

Figure 3:
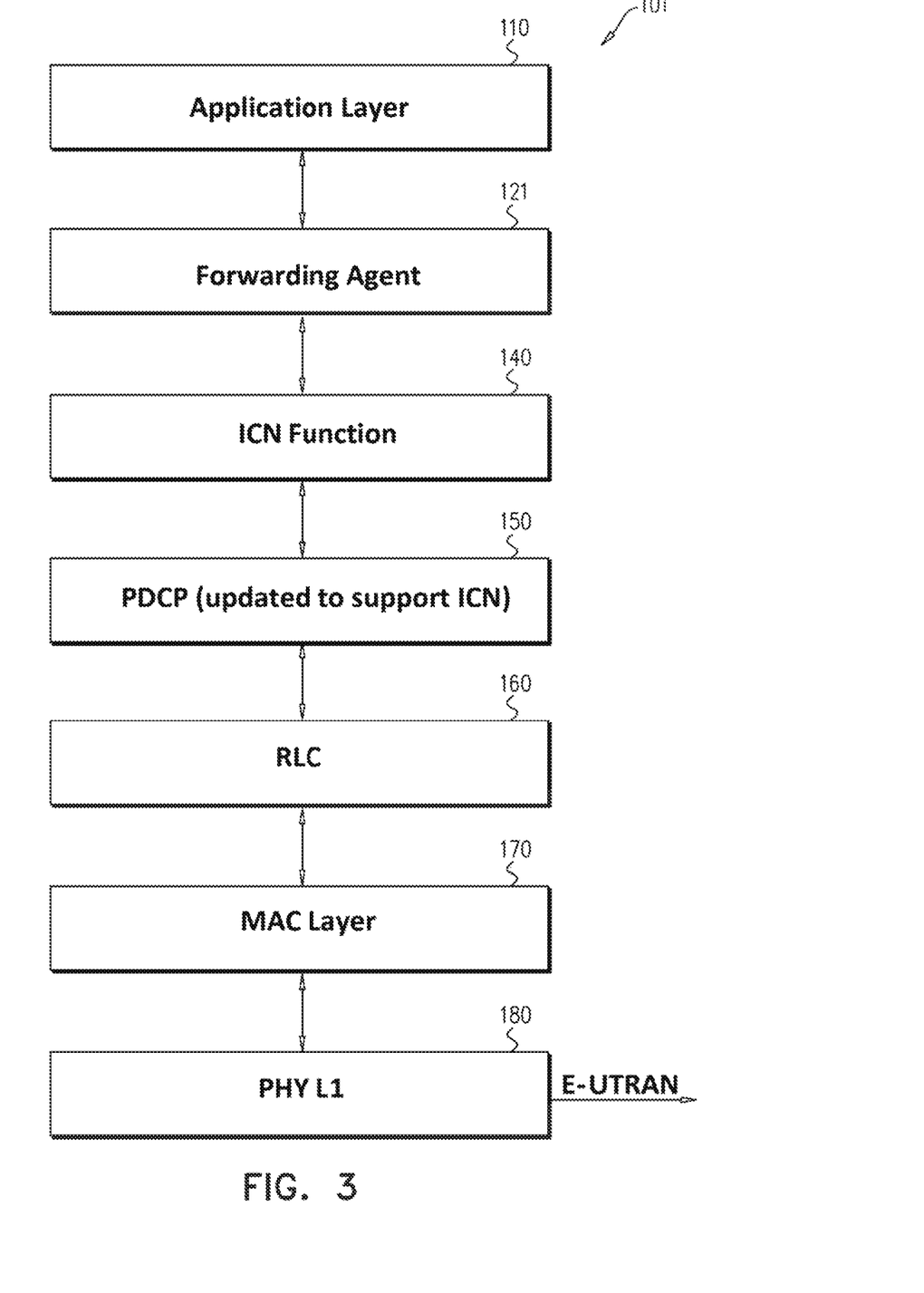

Reference is now made to FIG. 3 which is a simplified schematic diagram of an exemplary native ICN UE protocol stack 101 for implementing ICN on a UE in accordance with embodiments described herein. Protocol stack 101 may be generally similar to protocol stack 100 except as noted herein. Accordingly, protocol stack 110 may comprise application layer 110, RLC 160, MAC layer 170 and physical layer 180, each of which may respectively function in a generally similar manner as similarly referenced elements in protocol stack 100.

Protocol stack 101 also comprises forwarding agent 121 and ICN function 140. Forwarding agent 121 may be a modified version of forwarding agent 120 configured to support communication between applications in application layer 110 and ICN function 140. Similar to forwarding agent 120, forwarding agent 121 may be implemented as a software based router implemented using any suitable mechanism such as, for example, Representational State Transfer (REST), TCP/IP socket and/or Extensible Markup Language (XML), etc.

It will be appreciated that similar to the application layer 110 in FIG. 2, the applications installed in application layer 110 of FIG. 3 may be compatible with either IP and/or ICN functionality. Accordingly, forwarding agent 121 may be configured to handle any one of three types of requests from application layer 110: IP-specific, where the application requests IP transport (either because the application doesn't support ICN or has, for whatever reason, been configured to prefer IP); ICN-specific, where the application requests ICN transport (either because the application doesn't support IP or has, for whatever reason, been configured to prefer ICN); or IP/ICN, where the application supports both IP and ICN and allows forwarding agent 121 to determine which transport protocol to use.

Forwarding agent 121 may therefore be operative to forward native ICN-based requests from application layer 110 to ICN function 140. Forwarding agent 121 may also be operative to forward protocol agnostic (i.e., where no transport protocol is specified) requests to ICN function 140. Forwarding agent 121 may also be operative to overlay ICN over IP-based requests and to forward the overlaid requests to ICN function 140.

Protocol stack 101 also comprises PDCP 150, which may be modified to support ICN as in the embodiment of FIG. 2. Accordingly, PDCP 150 may be operative to support both native IP and ICN overlaid over. As discussed with respect to the embodiment of FIG. 2, ICN may be supported using a RoHC (RFC3095) header compression technique having enhanced algorithms to implement ICN.

In accordance with the embodiment of FIG. 3, when the UE connects to a mobile network, the mobile network may employ ICN functionality to fetch content from internet/application servers serviced by the mobile provider to provide data to the UE. In existing, IP-based LTE, when a given UE is powered up, it establishes a radio link connection with a base station and starts attach procedures with the LTE network according to procedures described in the 3GPP Technical Specification (TS) 23.401. Since there is no IP function in the embodiment of FIG. 3, the UE may perform the attach procedures using ICN protocol. For example, the UE may be configured to use a Protocol Configuration Option Information Element (PCO IE) field to communicate its ICN capability during attach procedures.

It will be appreciated that in order to support native ICN functionality for NAS signaling, mobility and/or session management, significant changes may be needed in device modem firmware and software upgrades. Accordingly, in order to limit the impact on NAS signaling—due to dependencies on the Mobility Management Entity (MME), Home Subscriber Server (HSS) and other elements—in accordance with some embodiments described herein, NAS signaling may be maintained using IP, whereas ICN may be implemented and used natively for content delivery.

It will be appreciated that as referred to herein, the term 'user equipment' (UE) may be inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™, iPad™, a Google Android™ phone, an IP phone, a wearable electronic device, or any other device, component, element, or object capable of initiating voice, audio, video, media, or data exchanges within communication system 10. A UE may also include a suitable interface to a human user such as a microphone, a display, a keyboard, or other terminal equipment. It will further be appreciated that UEs may comprise a processor configured to operate the UE's software, firmware, and/or hardware components.

Figure 4:
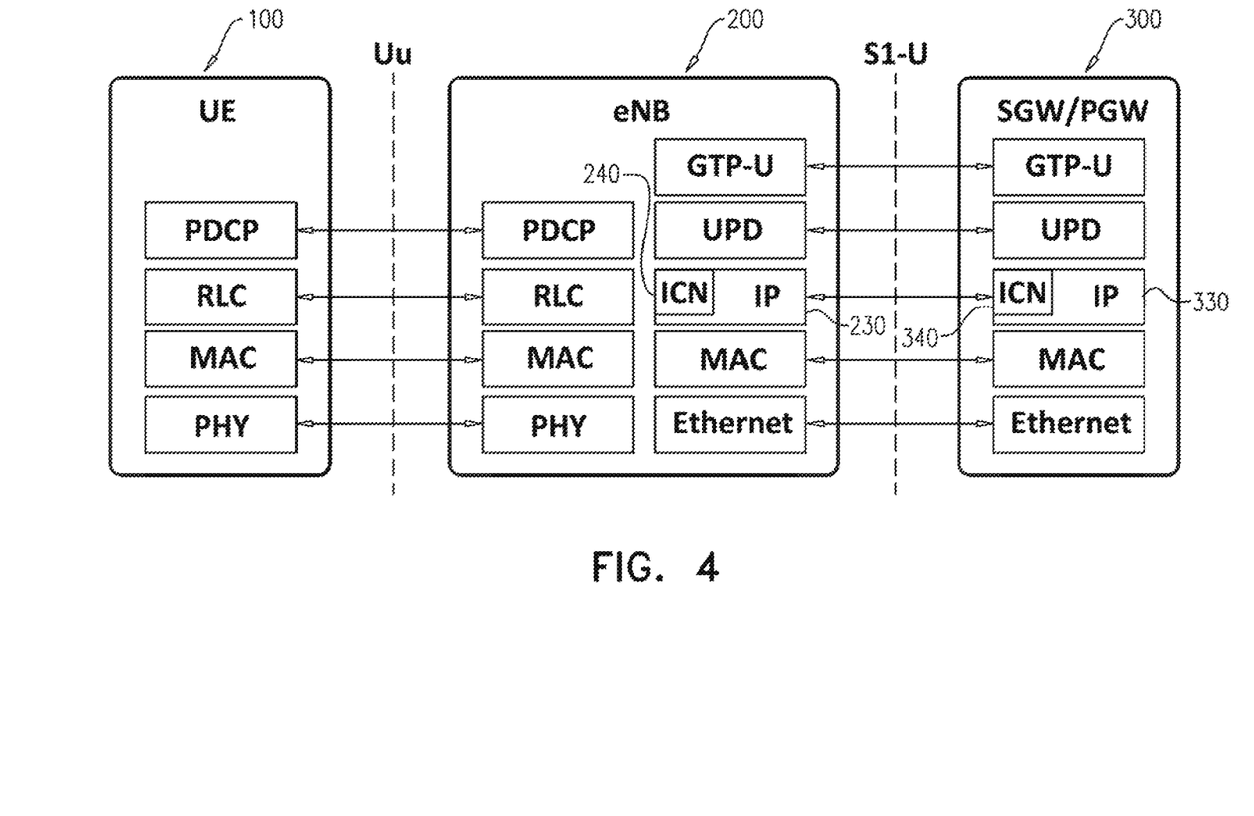
FIG. 4 and FIG. 6 are simplified schematic diagrams illustrating an exemplary mobile base station protocol stack aligned opposite a UE protocol stack, and an exemplary evolved packet core (EPC) protocol stack, according to the architecture of FIG. 1.
Figure 5:
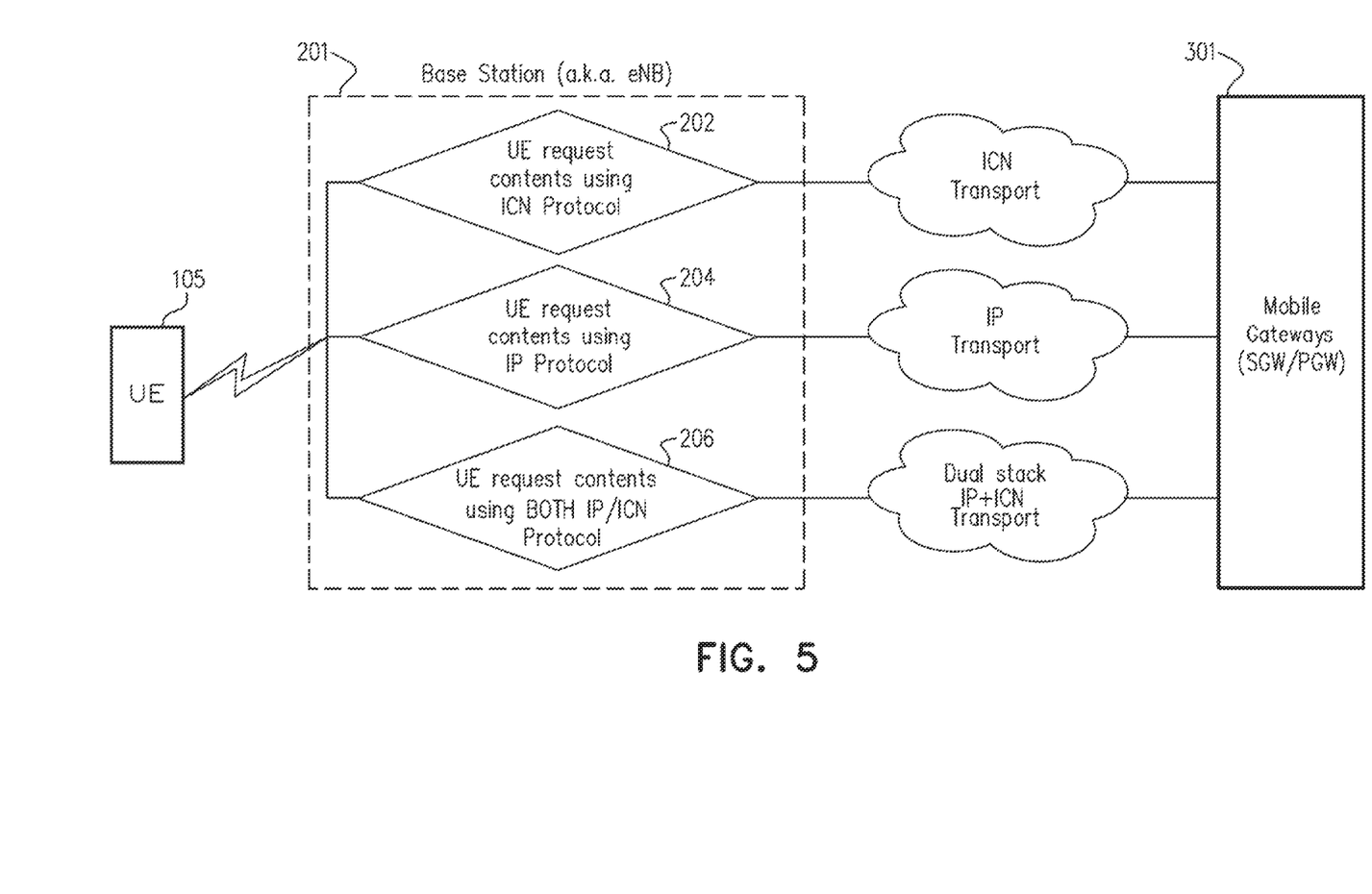
FIG. 5 is a simplified schematic diagram which illustrates a logical flow for requests received by a mobile base station from a UE and forwarded to mobile gateway according to the architecture of FIG. 1.

Reference is now made to FIG. 4 which is a simplified schematic diagram illustrating an exemplary mobile base station protocol stack 200 (e.g., as implemented on an eNB as depicted in FIG. 4) aligned opposite a UE protocol stack 100 and an exemplary EPC protocol stack 300 (e.g., as implemented on an SGW/PGW as depicted in FIG. 4), in accordance with embodiments described herein. Reference is made also to FIG. 5 which illustrates a logical flow for requests received by mobile base station 201 from UE 105 and forwarded to mobile gateway 301. It will be appreciated that UE 105 may be an IP-only UE, or configured with protocol stack 100 or 101 as described with respect to FIGS. 2 and 3; base station 201 may be configured with mobile base station protocol stack 200; and mobile gateway 301 (e.g., an SGW or PGW) may configured with EPC protocol stack 300.

As illustrated in FIG. 5, when UE 105 powers up, it may perform attach procedures using IP protocol to send control messages. Depending on the configuration of UE 105, on successful attachment, UE 105 may have an ICN-based identity, IP-based identity, or dual ICN+IP identity. When a user of UE 105 initiates a content request via an application on UE, the request may subsequently be sent to base station 201, and then forwarded to mobile gateway 301 according to the following logic:

If UE 105 sends an ICN request (step 202), base station 201 may forward the request to mobile gateway 301 either using native ICN (if such transport is supported), or ICN as overlay on IP where native ICN support is unavailable.

If UE 105 sends an IP request (step 204), base station 201 may forward the request to mobile gateway 301 using native IP.

UE 105 may also send a non-specified "ICN or IP" request (step 206) accompanied by additional qualifying parameters such as weight, priority, cost, network congestion. It will be appreciated that the additional qualifying parameters may be configurable. Base station 201 may use the parameters to determine the most resource efficient option for forwarding the request from among native IP, native ICN, or ICN over IP, depending on the supported transport Returning to FIG. 4, protocol stack 200 may be implemented in a mobile base station (e.g. an eNodeB or eNB) and may comprise IP function 230 and ICN function 240 incorporated at the network layer on an S1-U interface between the mobile base station and an EPC element (e.g. SGW or PGW). It will be appreciated that an existing IP based S1-U interface may be modified to support a dual stack with both ICN and IP routing; this interface may be used to carry user plane traffic through a GPRS Transport Protocol (GTP) tunnel to either IP function 330 or ICN function 340 in protocol stack 300. It will be appreciated that in such manner, ICN functionality may be incorporated into protocol stack 200 without disturbing the MAC layer.

When ICN Interest or Data packets are received from a dual stack ICN/IP or native ICN UE (e.g., according to the embodiments of FIGS. 2 and 3), ICN function 240 may be used to process the received packets. If S1-U supports only IP routing, i.e., not ICN, ICN messages may be overlaid on top of IP. Similarly, when an IP-based request for content delivery is received, it will use the standard S1-U interface.

It will be appreciated that the implementation of ICN function 240 in protocol stack 200 may facilitate content caching for local delivery using the ICN transport protocol. It will be appreciated that ICN function 340 in protocol stack 300 is implemented at a SGW or PGW to support ICN based routing for the protocol stack 200 of base station. ICN function 340 may facilitate servicing content cached at the SGW or PGW. Similar ICN functionality may also be implemented at CDN 400.

Figure 6:
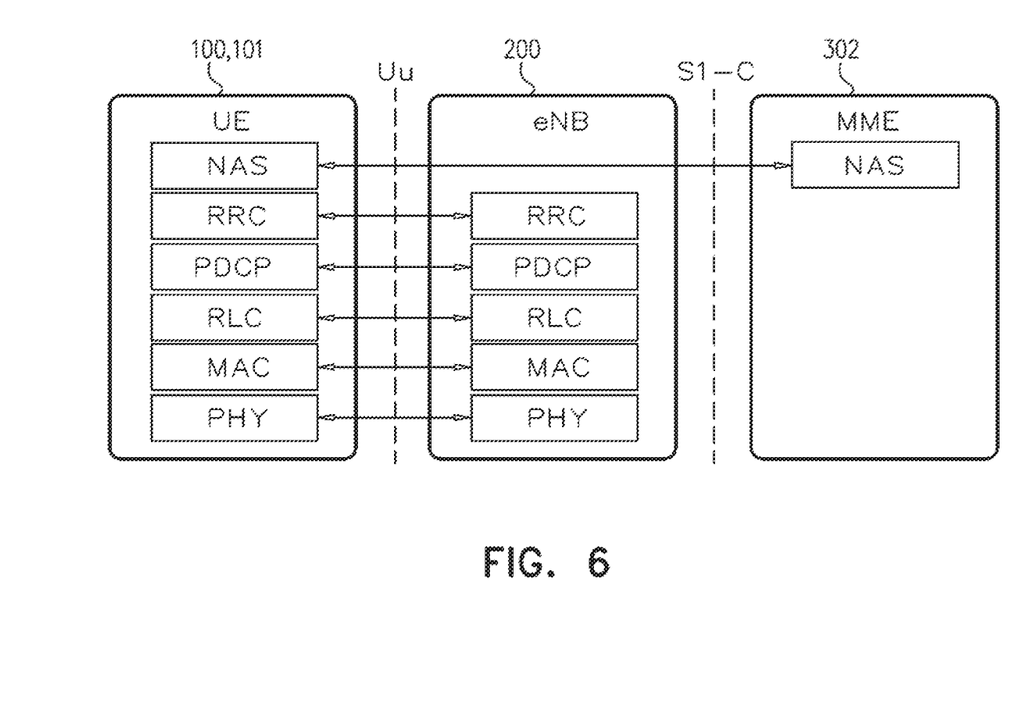

Reference is now made to FIG. 6 which is a simplified schematic diagram illustrating an exemplary mobile base station protocol stack 200 aligned opposite either UE protocol stack 100 or 101 and an exemplary MME 302, in accordance with embodiments described herein. As will be described with respect to the embodiment of FIG. 6, depending on the configuration of the devices involved, NAS signaling may also be implemented with ICN transport. To implement ICN for NAS signaling and mobility management, the following steps may be performed:

A UE using protocol stack 100 or 101 may send NAS messages using a radio interface. The receiving base station (e.g. eNB) may process the NAS message and forward it to MME 302 using a S1-C interface. The S1-C interface may be configured to support IP, ICN, or dual stack (IP+ICN). If the NAS message was received using ICN protocol, then the base station may process the message and forward it to MME 302 using ICN transport. If ICN transport is not supported between the base station and MME 302, the base station may forward the NAS message using ICN overlay on IP transport. If the NAS message was received using IP protocol, then the base station may process the message and forward it to MME 302 using IP transport.

Figure 7:
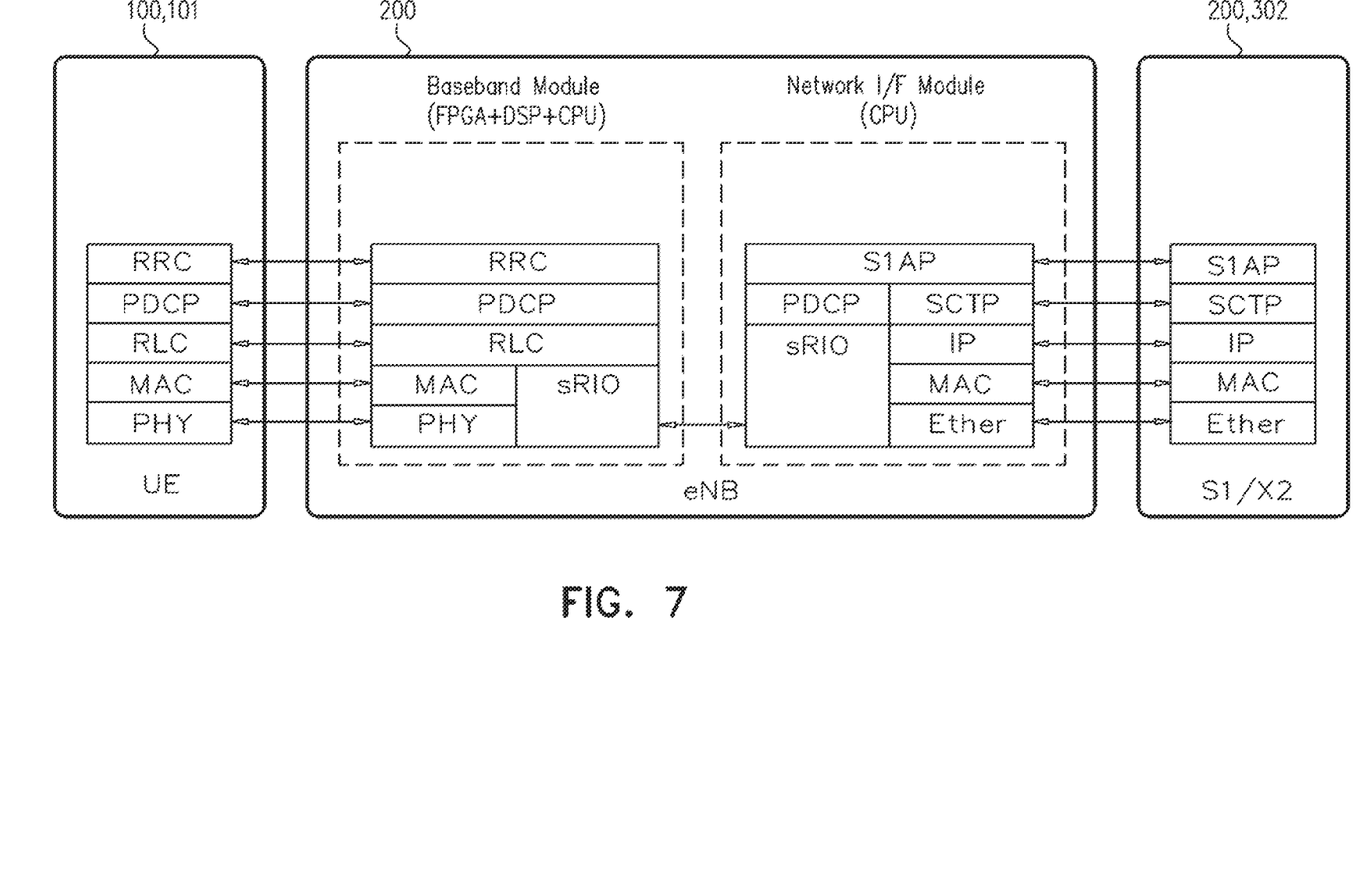
FIG. 7 is a simplified schematic diagram illustrating an exemplary mobile base station protocol stack aligned opposite a UE protocol stack, and either another mobile base station protocol stack or a Mobility Management Entity (MME) according to the architecture of FIG. 1.

Reference is now made to FIG. 7 which is a simplified schematic diagram illustrating an exemplary mobile base station protocol stack 200 aligned opposite either UE protocol stack 100 or 101, and either another protocol stack 200 or MME 302, in accordance with embodiments described herein. It will be appreciated that in operation, a UE sends mobility management messages such as location updates, handover requests, etc. Handover requests may be sent when the UE moves or it detects a better signal from another base station. The associated handover messages are processed via either X2 interface (for eNB to eNB handovers), or S1 interface (for eNB to MME/SGW handovers). ICN has built-in functionality to support mobility by re-expressing Interest when the UE moves or detects a better signal from another base station. The following steps may be used to implement ICN for mobility management:

For a handover to MME 302, if a mobility management message is received using ICN protocol, then the base station may process and forward the message to MME 302 using ICN transport via the S1-C interface. If ICN transport is not supported between the base station and MME 302, the base station may forward the message using ICN overlay on IP transport. For a handover to another base station (i.e., eNB to eNB), the base station may send handover control messages as well as user data using ICN protocol via an X2 interface. If ICN is not supported on the X2 interface, then the base station may use ICN overlay over IP transport via the X2 interface.

If the mobility management message is received using IP protocol, the base station may process the message and forward it using IP transport to either MME 302 using S1-C interface, or to another base station using X2 interface. For eNB to eNB handover, both handover control messages and user data may be sent by the base station.

If the mobility management message is received using ICN or IP protocol, then the base station may determine which protocol, IP or ICN, to be used. The base station may factor weight, priority, cost, etc. into the determination process.

It will be appreciated that as referred to herein, a base station may include any subset of base station functionalities for a Radio Access Network (RAN), such as for example: NodeB functionalities, Radio Network Controller (RNC) functionalities, Home NodeB (HNB), and base transceiver station (BTS) functionalities for 2nd Generation (2G) and/or 3rd Generation (3G) mobile access network technologies such as Global System for Mobile Communications (GSM), Enhanced Data Rates for GSM (EDGE), radio access network (GERAN), and/or Universal Mobile Telecommunications System (UMTS) Terrestrial radio access network (UTRAN); evolved Node B (eNodeB or eNB) functionalities and/or Home eNodeB (HeNB) functionalities for 4th Generation (4G) LTE mobile access network technologies such as evolved UTRAN (E-UTRAN), 5th Generation (5G) access network base station functionalities; combinations thereof, or the like.

In general, the Evolved Packet Core (EPC) provides session management functionality for a UE. When a UE is powered-on, it performs NAS signaling and after successful authentication it attaches with either a PGW for LTE networks or a Gateway GPRS Support Node (GGSN) for 3G cellular network. The PGW or GGSN is the anchoring point for the UE and is responsible for service creations, authorization, session maintenance, eventual termination upon UE power-off, etc. In accordance with embodiments described herein, ICN functionality may be implemented in the EPC.

Returning to FIG. 1, ICN function 340 may be inserted at the session management layer of protocol stack 300 in parallel with existing IP functionality. The session management layer is used for performing attach procedures and assigning a logical identity to the UE user. After successful authentication by HSS, the MME may send a Create Session Request (CSR) to the SGW, and the SGW may send the CSR to the PGW.

In accordance with embodiments described herein, a CSR may be enhanced to include a Protocol Configuration Option Information Element (PCO IE), which may be used to indicate ICN support by the UE providing the request, according to the embodiments of FIGS. 3 and 4.

For a dual stack UE (e.g., the UE of FIG. 3), the PGW may support attachment in terms of both IP and ICN based transport; the UE name may be registered and used for session management. For an ICN capable UE, the PGW may be configured to provide ICN attachment. For a native IP UE, the PGW may use known IP functionality for attachment.

It will be appreciated that in accordance with embodiments described herein, ICN function 340 may be configured with full ICN functionality, such as, for example, forwarding capabilities (e.g., Content Store (CS), Pending Interest Table (PIT) and Forwarding Information Base (FIB) tables). In accordance with at least one embodiment, the PGW may cache contents locally according to ICN protocol using CS functionality provided therein.

Figure 8:
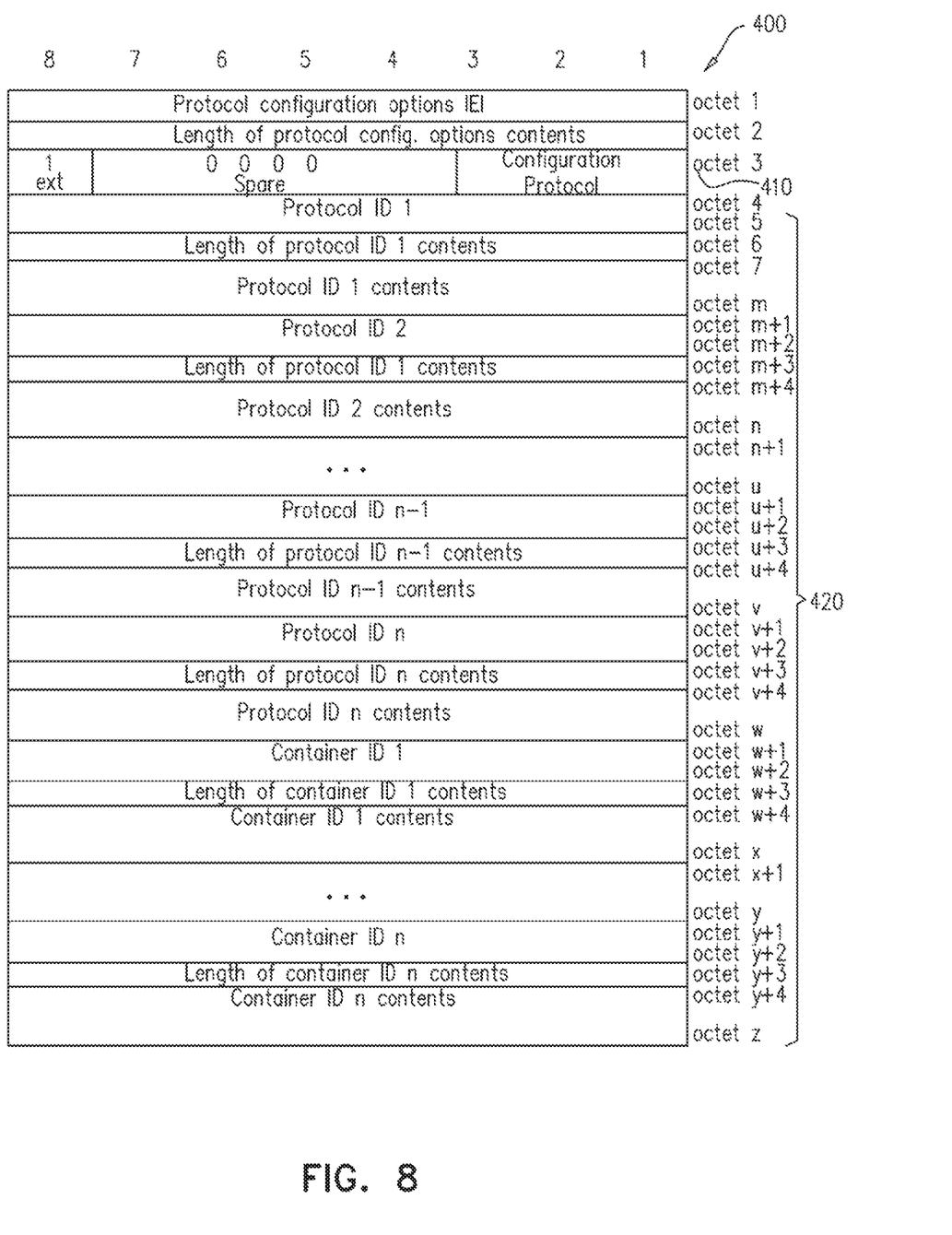
FIG. 8 illustrates a 3GPP protocol configuration field layout.

Reference is now made to FIG. 8 which illustrates a 3GPP protocol configuration field layout 400 that may be leveraged to provide support for ICN in LTE according to embodiments described herein.

Octet 3, as denoted by reference numeral 410, may be used to carry configuration protocol information (where configuration protocols define a PDN type) which may be enhanced to contain details about IP (either IPv4, IPv6, or both) or ICN. Furthermore, combinations of Octet 4 to Z, as denoted by reference numeral 420, may be used to provide additional information related to ICN capability. The PCO IE parameter (as discussed hereinabove) may be matched between UE and EPC gateways (e.g., MME, SGW, PGW) so that a UE may attach successfully.

Figure 9A:
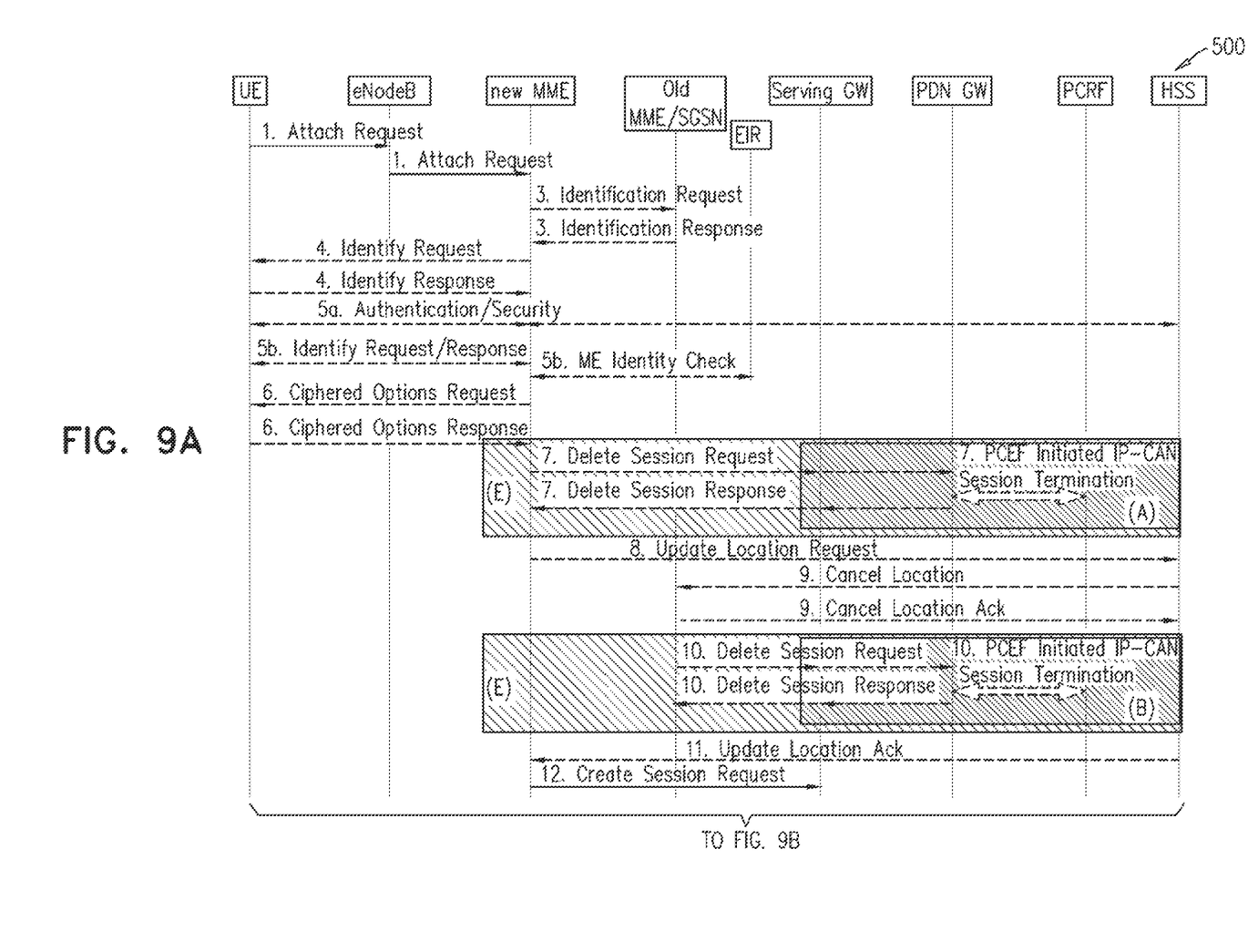
FIGS. 9A and 9B illustrate an exemplary attach procedure for a UE according to the architecture of FIG. 1.
Figure 9B:
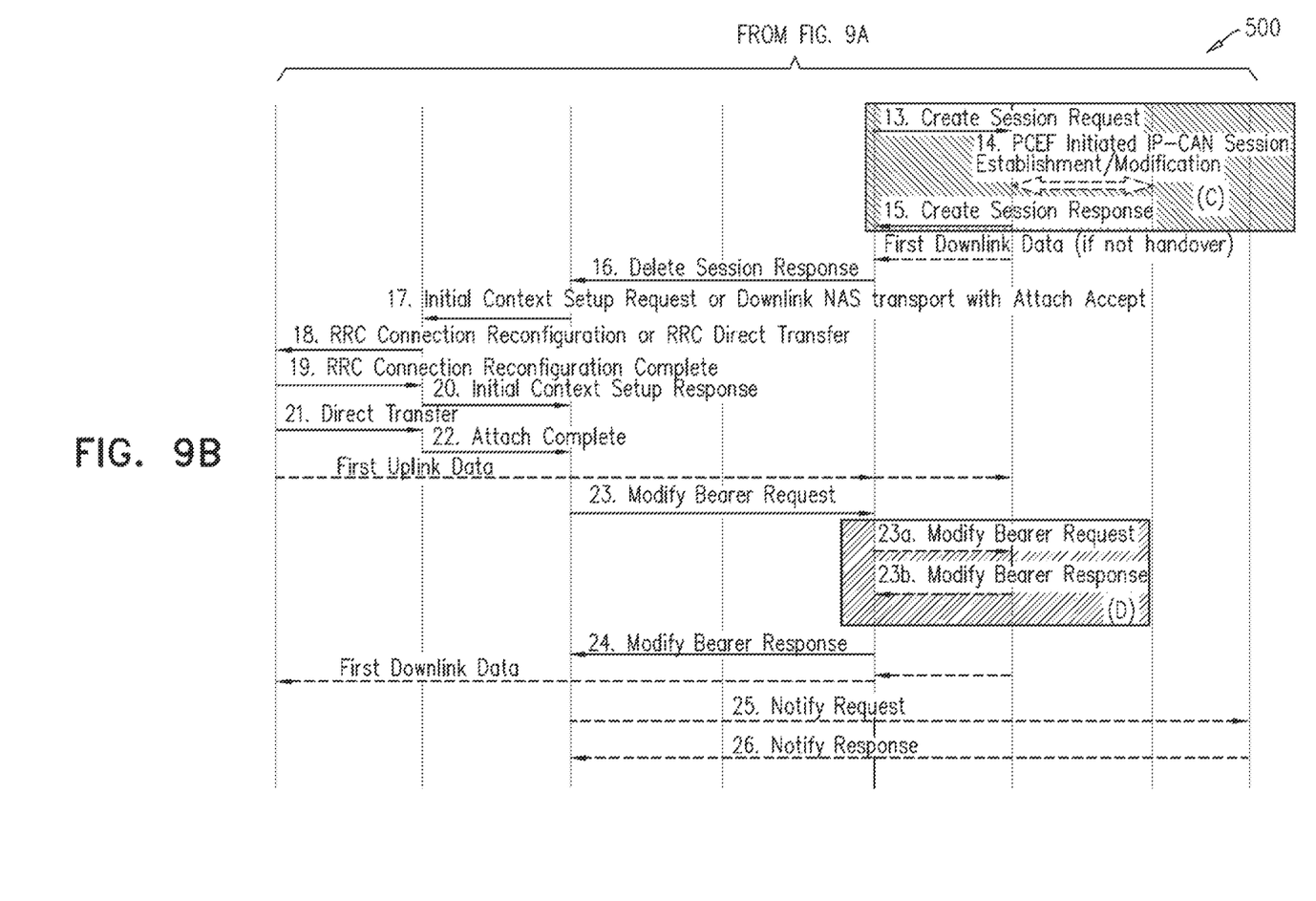

Reference is now made to FIGS. 9A and 9B which together illustrate an attach procedure according to 3GPP TS 23.401 V13.6.1 (2016-03) section 5.3.2.1. In accordance with embodiments described herein, steps 1 and 12-22 may be enhanced to include additional parameters to facilitate ICN implementation. As described hereinabove, ICN capability may be indicated in a PCO IE using a Tag Length Value (TLV) format. Enhanced functionality may be added to the existing steps of the attach procedure to support enhanced ICN capabilities in a PGW in addition to normal IP attach procedures.

At Step 1, a given UE may send an initial attach request. If the UE is ICN capable, the initial attach request may include the PCO IE field populated with an indication of ICN capability. Once the attach request is successful, the PGW assigns an address for the UE. For an IP-based UE, i.e., PDN=IP, the PGW may assign either an IPv4 or IPv6 (Link local) address in the create session request (CSR) in step 13. For PDN type=ICN, the PGW will register the UE with an ICN name according to the ICN protocol. This ICN-based name may then be used for the creation of session and context related functions (e.g., billing, mediation, enhanced charging function/deep packet inspection, lawful intercept, etc.) for the UE during the session.

As referred to herein, an EPC may include one or more mobile gateways hosting any or all functionalities for any combination of: Serving Gateway (SGW), Serving General Packet Radio Service (GPRS) Support Node (SGSN), Packet Data Network (PDN) Gateway (PGW), and/or Gateway GPRS Support Node (GGSN) operations. Traditionally, an SGW is a data-plane element that can provide functionality for managing user mobility and interfaces with RAN nodes (e.g., eNodeBs, NodeBs, HeNBs, HNBs, etc.). An SGW may also maintain data paths between RAN nodes and one or more PGWs. A PGW typically provides IP connectivity access network (IP-CAN) session connectivity for UEs to external Packet Data Networks (PDNs) (e.g., the Internet).

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention. It is further appreciated that there is provided a non-transient computer readable medium carrying computer readable instructions that when executed by a computing device cause the computing device to carry out any of the methods described herein.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A computer implemented method comprising:
indicating in an initial attach request sent by a User Equipment (UE) that the UE is Information Centric Networking (ICN) capable;
receiving an assigned ICN name upon success of the initial attach request;
receiving a request from an application layer on the UE;
determining whether the request is an ICN-based request using an ICN transport protocol or an Internet Protocol (IP)-based request using an IP transport protocol; and upon determining that the request comprises an ICN-based request:
    forwarding the ICN-based request to an ICN transport function on the UE; and
    compressing ICN headers in the ICN-based request using Robust Header Compression (RoHC).

2. The method according to claim 1 and further comprising receiving content from a Content Distribution Network (CDN) via the ICN transport protocol.

3. The method according to claim 2, wherein the content is received from a cache on an ICN-enabled mobile base station.

4. The method according to claim 2, wherein the content is received from a cache on an ICN-enabled core Evolved Packet Core (EPC) gateway.

5. The method according to claim 2, wherein the content is received as an ICN-based multicast to a plurality of UEs.

6. The method according to claim 1, wherein the initial attach request is associated with attaching to a Long Term Evolution (LTE) mobile network.

7. The method according to claim 1, further comprising overlaying the ICN-based request over the IP transport protocol, wherein the UE supports both the ICN transport protocol and the IP transport protocol.

8. The method according to claim 2, further comprising:
    delivering the content using the ICN transport protocol; and
    using the IP transport protocol for Non-Access Stratum (NAS) signaling.

9. The method according to claim 1, wherein receiving the request comprises receiving an ICN+IP request from the application layer, and wherein the ICN+IP request is associated with both the ICN transport protocol and the IP transport protocol, the method further comprising determining a preferred transport protocol from among the ICN transport protocol and the IP transport protocol according to parameters for limiting network resource usage.

10. An apparatus comprising:
    a network interface configured to implement an Information Centric Networking (ICN) transport protocol; and
    a processor configured to:
        indicate in an initial attach request that the apparatus is Information Centric Networking (ICN) capable;
        receive an assigned ICN name upon success of the initial attach request;
        receive a request from an application layer on the apparatus;
        determine whether the request is an ICN-based request using the ICN transport protocol or an Internet Protocol (IP)-based request using an IP transport protocol; and
        upon determining that the request comprises an ICN-based request:
            forward the ICN-based request to an ICN transport function on the apparatus; and
            compress ICN headers in the ICN-based request using Robust Header Compression (RoHC).

11. The apparatus according to claim 10, wherein the processor is further configured to receive content from a Content Distribution Network (CDN) via the ICN transport protocol.

12. The apparatus according to claim 11, wherein the processor is configured to receive the content from a cache on an ICN-enabled mobile base station.

13. The apparatus according to claim 11, wherein the processor is configured to receive the content from a cache on an ICN-enabled Evolved Packet Core (EPC) gateway.

14. The apparatus according to claim 10, wherein the processor is configured to use the initial attach request to attach to a Long Term Evolution (LTE) mobile network.

15. The apparatus according to claim 10, wherein the processor is configured to:
    receive the request by receiving an ICN+IP request from the application layer, and wherein the ICN+IP request is associated with both the ICN transport protocol and the IP transport protocol; and
    determine a preferred transport protocol from among the ICN transport protocol and the IP transport protocol according to parameters for limiting network resource usage.

16. One or more non-transitory computer readable media carrying computer readable instructions that when executed by a processor on a User Equipment (UE), cause the processor to:
    indicate that the UE is Information Centric Networking (ICN) capable in an initial attach request sent by the UE;
    receive an assigned ICN name upon success of the initial attach request;
    receive a request from an application layer on the UE;
    determine whether the request is an ICN-based request using an ICN transport protocol or an Internet Protocol (IP)-based request using an IP transport protocol; and
    upon determining that the request comprises an ICN-based request:
        forward the ICN-based request to an ICN transport function on the UE; and
        compress ICN headers in the ICN-based request using Robust Header Compression (RoHC).

17. The non-transitory computer readable media according to claim 16, further comprising computer readable instruction operable to cause the processor to receive content from a Content Distribution Network (CDN) via the ICN transport protocol.

18. The non-transitory computer readable media according to claim 17, further comprising computer readable instruction operable to cause the processor to receive the content from a cache, and wherein the cache is either on an ICN-enabled mobile base station or on an ICN-enabled Evolved Packet Core (EPC) gateway.

19. The non-transitory computer readable media according to claim 16, further comprising computer readable instruction operable to cause the processor to use the initial attach request to attach to a Long Term Evolution (LTE) mobile network.

20. The non-transitory computer readable media according to claim 16, further comprising computer readable instruction operable to cause the processor to:
    receive the request by receiving an ICN+IP request from the application layer, and wherein the ICN+IP request is associated with both the ICN transport protocol and the IP transport protocol; and
    determine a preferred transport protocol from among the ICN transport protocol and the IP transport protocol according to parameters for limiting network resource usage.

* * * * *